United States Patent
Hall et al.

(10) Patent No.: US 6,496,263 B1
(45) Date of Patent: Dec. 17, 2002

(54) SYSTEM AND METHOD FOR PROVIDING AN IMPROVED IFOG HUB TO COIL THERMAL AND MECHANICAL SLIP INTERFACE

(75) Inventors: John R. Hall, Woodland Hills, CA (US); David F. Libman, Moorpark, CA (US); Thomas McLean, Woodland Hills, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 116 days.

(21) Appl. No.: 09/626,511

(22) Filed: Jul. 27, 2000

(51) Int. Cl.⁷ .............................................. G01C 19/72
(52) U.S. Cl. ....................................... 356/465
(58) Field of Search ................. 356/465, 460; 250/227.19, 227.27; 385/12

(56) References Cited

U.S. PATENT DOCUMENTS

| | | | |
|---|---|---|---|
| 5,545,892 A | | 8/1996 | Bilinski et al. ............. 356/465 |
| 5,767,509 A | * | 6/1998 | Cordova et al. ............ 356/465 |
| 5,822,065 A | * | 10/1998 | Mark et al. ................. 356/465 |
| 5,896,199 A | * | 4/1999 | Mark et al. ................. 356/465 |

FOREIGN PATENT DOCUMENTS

WO    WO 00/40928    7/2000

* cited by examiner

Primary Examiner—Samuel A. Turner
(74) Attorney, Agent, or Firm—Snell & Wilmer, LLP

(57) ABSTRACT

A system and method for providing a rotation sensor for use in a fiber optic gyroscope including a centrally-located cylindrical hub having an improved slip interface positioned there around. The central hub has a substantially planar mounting flange extending from one of its ends, where the axis of rotation of the central hub is orthogonal to the plane of the mounting flange. A sensor coil comprising a plurality of layers of coaxial turns of optical fiber embedded in a potting material is formed around an outer surface of the interface. The interface allows the potted coil to expand or contract along the axial direction of the central hub due to thermal expansion while maintaining a constant thermal and mechanical connection between the interface and the potted coil. In this manner, the present invention maintains the integrity of the potted coil and its connection to the interface during thermal expansion of the potted coil, thus minimizing temperature-induced Shupe bias errors in the rotation sensor.

57 Claims, 3 Drawing Sheets

SYSTEM AND METHOD FOR PROVIDING AN IMPROVED IFOG HUB TO COIL THERMAL AND MECHANICAL SLIP INTERFACE

BACKGROUND OF THE INVENTION

1. Field of the Invention

The present invention relates generally to a slip interface between sensor coils for fiber optic gyroscopes and mounting hubs, and specifically to an arrangement for supporting a potted sensor coil that minimizes temperature-induced Shupe effect due to fiber stressing.

2. Description of Related Art

An interferometric fiber optic gyroscope (IFOG) includes the main components of a light source, a beam splitter, a fiber optic sensing coil made of either polarization maintaining (PM) fiber or a low birefringence (standard telecommunications) fiber, a polarizer (sometimes more than one), and a detector for light from a light source which is split by loop beam splitter into counter-propagating waves traveling in the sensing coil. The associated electronics measure the phase relationship between the two interfering counter-propagating beams of light that emerge from opposite ends of the coil. The difference between the phase shifts experienced by the two beams is proportional to the rate rotation of the platform to which the instrument is fixed, due to the well known Sagnac effect.

Environmental factors can affect the measured phase shift difference between the counter-propagating beams, thereby introducing an error, such environmental factors include variables, such as temperature, vibration and magnetic fields. In general, such factors are unevenly distributed throughout the coil. These environmental factors induce variations in the optical light path that each counter-propagating wave encounters as it travels through the coil. The phase shifts induced upon the two waves are unequal, producing an undesirable phase shift which is indistinguishable from the rotation-induced signal.

Past approaches to reducing some of the sensitivities arising from environmental factors, have involved the use of a potting compound to pot the windings of the sensor coil within a matrix of an adhesive material. Such an approach is described in U.S. Pat. No. 5,321,593 for "Sensor Coil for Low Bias Fiber Optic Gyroscope", assigned to the assignee of the present application, and U.S. Pat. No. 5,546,482 for "Potted Fiber Optic Gyro Sensor Coil for Stringent Vibration and Thermal Environments", also assigned to the assignee of the present invention, both disclosures being incorporated herein by reference. Careful selection of the potting material (particularly in terms of elasticity) results in reduction of vibration-induced bias, coil cracking, degradation of h-parameter and temperature-ramp bias sensitivity. In these arrangements, the coil is formed on a spool of carbon composite material whose coefficient of expansion approximates that of the overlying fiber windings. By closely matching the thermal expansion characteristics of the spool and the fiber windings as well as properly selecting the coil potting material, the Shupe-like bias caused by thermal stress that would be otherwise exerted by a standard metallic spool is minimized.

While the use of adequate potting and spool materials will tend to minimize bias environmental sensitivities, conventional support and spool designs, which feature a substantially-cylindrical hub sandwiched between a pair of end flanges, are difficult to "match" to the potted coil. This is due to the asymmetry of expansions of such coils in response to temperature change. The coefficients of thermal expansion of a potted coil in the axial direction is often on the order of one-hundred (100) times that of the radial direction. Unfortunately, a corresponding asymmetry does not exist with regard to the supporting spool. Rather, spools of conventional design and material composition exhibit isotropic thermal expansion characteristics. This relative imbalance introduces bias errors through coil stressing and creates bonding and cracking problems with the potting material in the potted coil. For example, in a spool-and-coil arrangement in which the material of the hub of the spool closely approximates the radial coefficient of the thermal expansion of the potted coil, the axial expansion of the coil will exceed that of the hub. As a result, significant axial compression of the coil can occur when the temperature rises since axial expansion of the potted coil is limited by a relatively "fixed' separation distance between the spool's end flanges. Further, the stressing due to differential thermal expansion coefficients at the coil-hub interface can result in either rupture or in coil cracking. On the other hand, in a spool fabricated of material closely matching the axial coefficient of thermal expansion of the potted coil, one may expect the relatively-greater radial expansion of the hub in response to temperature change to degrade performance by squeezing the fiber of the coil whose radial dimension is relatively fixed.

In order to address the thermally-induced Shupe bias that results from the aforementioned thermal incompatibility of conventional spool designs with the asymmetric radial and axial thermal expansion coefficients of potted sensor coils, there have been attempts at designing spools with a single mounting flange and an interior hub. In these arrangements, the coil is mounted on the hub with its central axis traverse to the plane of the flange so that the coil is free to expand axially without the constraint of a second flange on the opposite side of the potted coil from the single mounting flange. For instance, U.S. Pat. No. 5,545,892 of Bilinski et al., entitled "Gyro Sensor Coil with Low-Friction Hub Interface", also assigned to the assignee of the present invention, discloses a single mounting flange and central hub assembly having the central hub coated with a non-adhesive material. The non-adhesive coating provides a relatively friction-free surface upon which the innermost layer of the potted coil is free to slide to accommodate its significant axial expansion when subject to heating. The disclosure of this reference is hereby incorporated by reference.

Although this approach of using a non-adhesive coating on the central hub allows the potted coil to expand axially in response to temperature changes, the potted coil is not mechanically connected to the central hub and can become physically separated from the surface of the non-adhesive coating when the potted coil experiences thermal expansion or compression due to certain temperature changes. This mechanical separation causes the potted coil to become thermally disconnected from the central hub, which can result in sudden changes in the Shupe-driven bias behavior of the IFOG. Further, the separation of the potted coil from the central hub subjects it to vibration-induced bias effects that result from the free-standing arrangement of the potted coil relative to the spool. Such bias effects can become particularly acute in an environment that includes vibrations at the resonant frequency of the potted coil. Moreover, the operative mechanism of such device for overcoming the effects of axial coil expansion relies upon the ability of the potted coil to slide freely upon the surface of the hub. Even slight imperfections in the coating on the hub can on occasion cause a deleterious so-called "stick and slip" phenomenon. This effect can cause irregular and quasi-periodic stressing of the coil fiber resulting in unpredictable bias errors in the gyro output.

SUMMARY OF THE INVENTION

The foregoing shortcomings and disadvantages of the prior art are alleviated by the present invention that provides a rotation sensor for use in a fiber optic gyroscope including a centrally-located cylindrical hub having an improved hub-to-coil slip interface positioned there around. The central hub has a substantially planar mounting flange extending from one of its ends, where the axis of rotation of the central hub is orthogonal to the plane of the mounting flange. A sensor coil comprising a plurality of layers of coaxial turns of optical fiber embedded in a potting material is formed around an outer surface of the slip interface. The slip interface allows the potted coil to expand or contract along the axial direction of the central hub due to thermal expansion while maintaining a constant thermal and mechanical connection between the interface and the potted coil. In this manner, the present invention maintains the integrity of the connection of the potted coil to the slip interface during thermal expansion of the potted coil, thus minimizing temperature-induced Shupe bias errors in the rotation sensor.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a system and method for providing an improved IFOG hub to coil thermal and mechanical slip interface.

Figure 1:
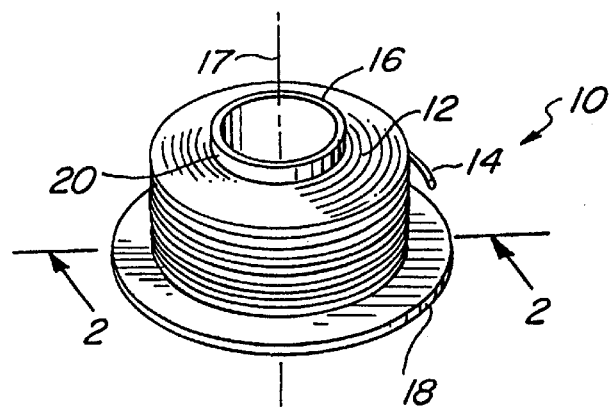
FIG. 1 is a perspective view of a preferred embodiment of a rotation sensor formed in accordance with the present invention.

FIG. 1 is perspective view of a rotation sensor 10 for a fiber optic gyroscope formed in accordance with the present invention having a sensor coil 12 comprising a plurality of turns of an optical fiber 14 engaged to a spool 16 of the type wherein the central axis of the coil (as indicated by dashed line 17) is orthogonal to the plane of a single mounting flange 18. The spool 16 includes a central cylindrical hub 20 having the mounting flange 18 extend radially from one ends. The sensor 10 is formed by winding the continuous optical fiber 14 in a predetermined configuration around the central hub 20. During the winding process or thereafter the coil 12 is impregnated with a potting material, wherein this potting material further serves to bond the coil 12 to the mounting flange 18. Alternatively, a separate layer of adhesive material may be used to adhere the potted coil 12 to the mounting flange 18.

Figure 2:
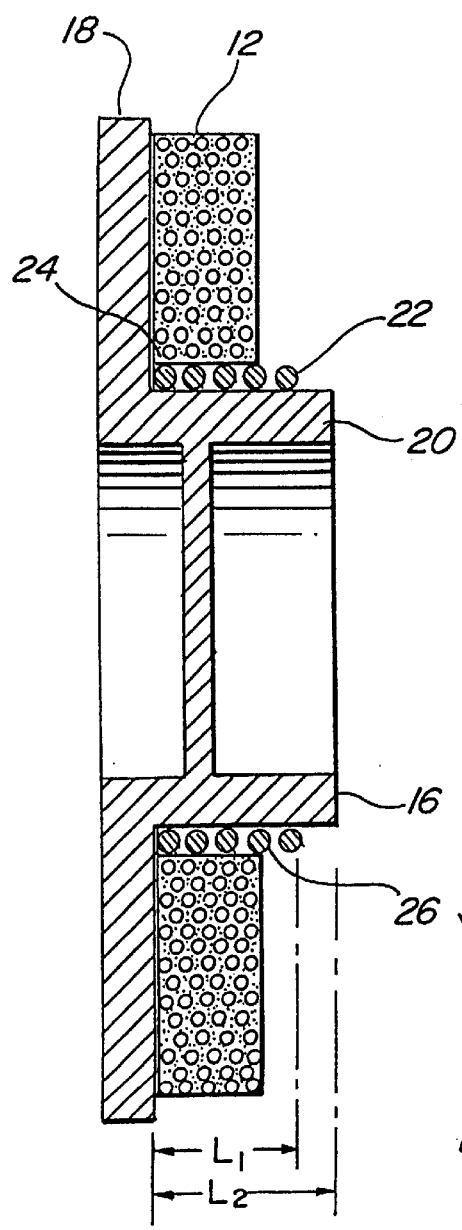
FIG. 2 is a cross-sectional view of the rotation sensor of FIG. 1 taken generally along lines 2—2.

In order to overcome the effects of Shupe bias errors associated with prior rotation sensors when the potted coil would become separated from the central hub during thermal expansion, the rotation sensor 10 of the present invention includes a slip interface 22 positioned between the potted coil 12 and the central hub 20, as shown in FIG. 2. The innermost layer 24 of the potted coil 12 is wound upon and in contact with the slip interface 22. In contrast to free-standing coil arrangements, the potted coil 12 is not free-standing as it is radially supported by the central hub 20 of the spool 16 through its connection to the slip interface 22. As a result, the potted coil 12 does not in and of itself constitute an independent structure subject to vibrations near or at its resonant frequency. Rather, it is secured to the spool 16 both through intimate contact to the slip interface 22 and further by being affixed to the mounting flange 18 to form a combined composite structure whose resonant frequency is much high than that of a free-standing potted coil.

The slip interface 22 minimizes Shupe bias errors by allowing thermal expansion of the potted coil 12 along the axial direction of the central hub 20 while maintaining a constant thermal and mechanical connection with the potted coil 12. The slip interface 22 preferably comprises a helically-wound spring having an inner diameter slightly larger the outer diameter of the central hub 20 so that there is a minimal gap between the slip interface 22 and the hub 20. The slip interface 22 will be described hereinafter as comprising a helically-wound spring, but it is the intention of the inventors of the present invention that the slip interface 22 may also comprise a plurality of individual hoops or rings positioned in a spaced-apart relationship along the central hub 20 or may comprise other similar structures having a plurality of portions spaced-apart from one another along the axial direction of the central hub 20.

The central hub 20 is preferably formed of a material having low thermal expansion characteristics, such as titanium, an appropriate carbon composite, or other low-thermal expansion materials. The slip interface 22 is formed of a material having substantially the same thermal expansion characteristics as the central hub 20 in order to minimize thermal stresses between the slip interface 22 and the central hub 20. The slip interface 22 has a resting length $L_1$ extending along an axial direction of the outer diameter of the central hub 20, wherein the length $L_1$ of the slip interface 22 is less than the axial length $L_2$ of the central hub 20 in order to allow the slip interface 22 to expand along the axial direction of the central hub 20. The helical winds of the slip interface 22 are separated by spaces 26 in the axial direction of the central hub 20 to further allow the slip interface 22 to contract along the central hub 20. In the helically-wound spring configuration of the slip interface 22, the spaces 26 may exist in the resting length $L_1$ of spring slip interface 22 or the slip interface 22 can be stretched to provide these spaces 26 between the spaced-apart portions of the slip interface 22. This stretching of the slip interface 22 would further cause the inner diameter of the spring slip interface 22 to tighten over the outer diameter of the central hub 20 to further resist radial vibrations, where the amount of stretching can be chosen based on the desired radial vibration performance.

As previously described, the potted coil 12 will experience volumetric expansion and contraction as it undergoes temperature cycling, where this results in a disparity between axial and radial thermal expansions. By forming the potted coil 12 over a slip interface 22 having the ability to expand and contract, the structure of the slip interface 22 provides a surface which may expand and contract in the axial direction in conjunction with the thermal expansion of the potted coil 12. The unified movement of the slip interface 22 and the potted coil 12 due to the thermal expansion of the potted coil 12 in the axial direction prevents thermal stresses from developing between the slip interface 22 and the potted coil 12. This reduction of thermal stresses prevents cracks from forming in the potting material in the potted coil 12 and maintains the integrity of the mechanical bond between the potted coil 12 and the slip interface 22, thus minimizing the Shupe bias errors which would result from cracks developing in the potting material in the potted coil 12 and from the potted coil 12 becoming mechanically and thermally separated from the central hub 20 during thermal expansion. The rotation sensor 10 of the present invention provides a slip interface 22 between the central hub 20 and the potted coil 12 which increases the resonant vibration frequency of the coil structure well beyond the range of vibration inputs without sacrificing the ability to absorb vastly different degrees of thermal expansion in the radial and axial directions.

Figure 3:
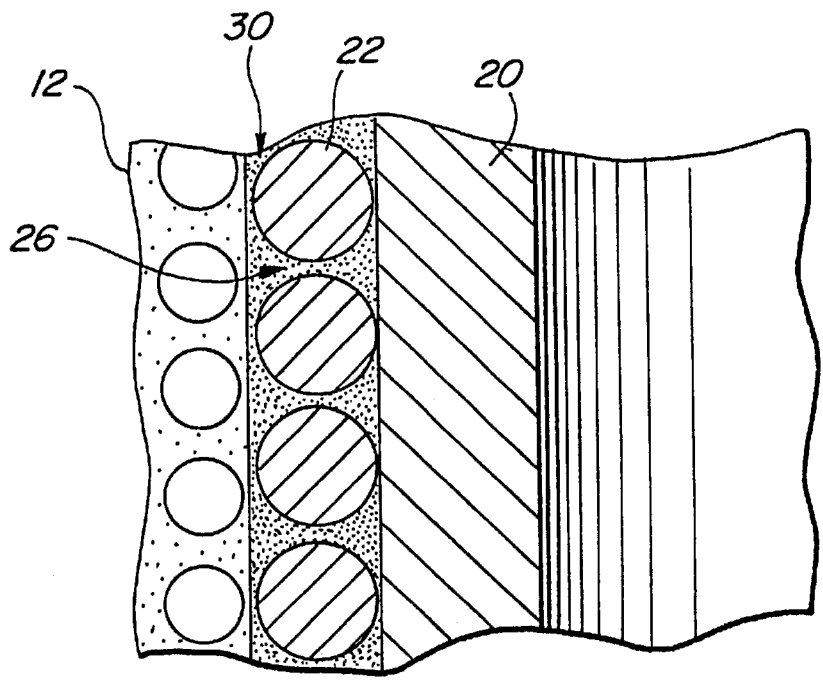
FIG. 3 is a fragmentary, cross-sectional view of another preferred embodiment of a rotation sensor formed in accordance with the present invention.

In another preferred embodiment of the present invention as shown in FIG. 3, a base layer of potting material 30 is formed over the slip interface 22 prior to the winding the potted coil 12. The base layer 30 provides a smoother and more pliant surface on which the potted coil 12 can be wound in order to prevent the optical fiber in the first layer 24 of the potted coil from becoming compressed or squeezed during the winding process. Thus, the base layer 30 further assists in reducing fiber stressing in the potted coil 12. The base layer 30 preferably comprises the same potting material used in the potted coil 12 or may include other materials substantially matching the thermal expansion characteristics of the potting material used in the potted coil 12 so as to minimize thermal stresses between the two potting materials. The base layer 30 extends in the spaces 26 between the spaced-apart portions of the slip interface 22 and allows the slip interface 22 to contract along the axial direction of the central hub 20.

Figure 4:
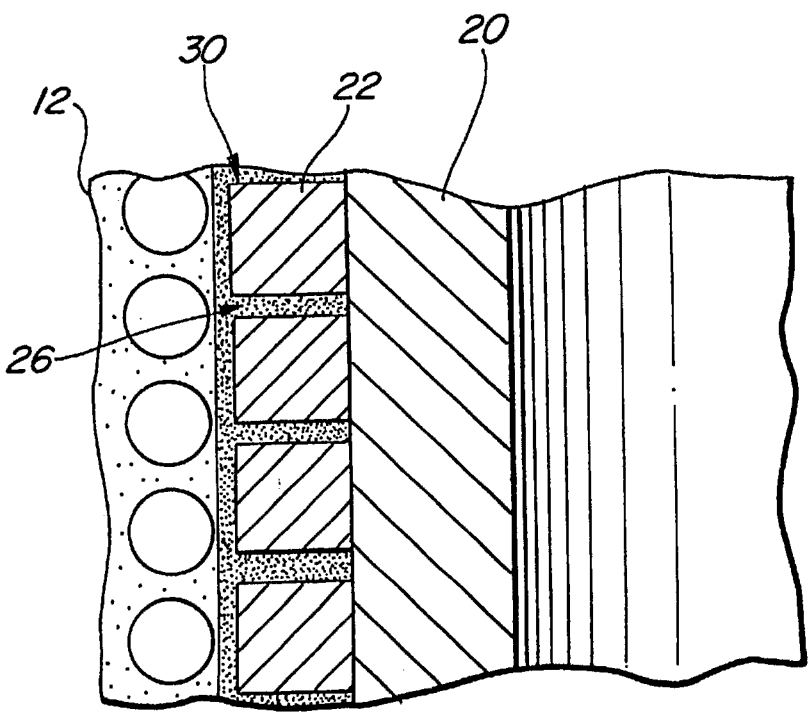
FIG. 4 is a fragmentary, cross-sectional view of yet another preferred embodiment of a rotation sensor formed in accordance with the present invention.

In each of the embodiments of the present invention, the particular size, shape, and configuration of the slip interface 22 can be chosen depending upon a variety of design considerations, including the desired thermal expansion characteristics of the slip interface 22, the potted coil 12, the base layer 30, and the central hub 20. Other factors which may also be taken into consideration when selecting the configuration of the slip interface 22 include but are not limited to the desired heat transfer from the central hub 20, the amount of friction between the central hub 20 and the slip interface 22 from movement of the slip interface 22 during thermal expansion of the potted coil 12, and the particular winding of the potted coil 12. The particular cross-sectional shape of the helical winding or rings of the slip interface 22 can be variably chosen based upon the above-listed design considerations. For instance, the slip interface 22 can have a rectangular cross-sectional shape in order to provide a smooth, flat surface for winding the potted coil 12 thereupon, as illustrated in FIG. 4. Furthermore, the number of windings in the interface 22 and the length of the spacing 26 between the spaced-apart portions of the slip interface 22 can also be selected depending upon the particular thermal expansion characteristics of the potted coil 12 and base layer 30.

Figure 5:
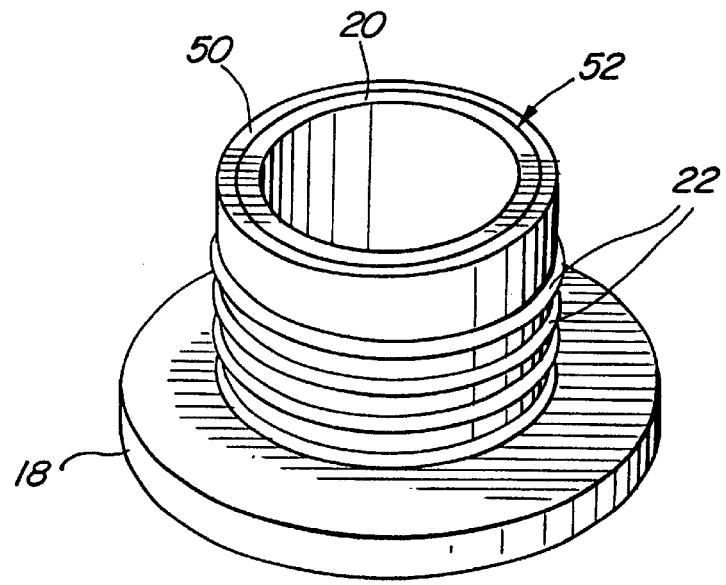
FIG. 5 is a perspective view of a partially-constructed rotation sensor in accordance with another preferred embodiment of the present invention formed using a cylindrical shim.

Referring now to FIG. 5, another preferred embodiment of a rotation sensor 52 of the present invention is illustrated where a cylindrical shim 50 is positioned in the gap between the central hub 20 and the slip interface 22 in order to retain the slip interface 22 in its desired position while the rotation sensor 52 is formed. The inner diameter of the slip interface 22 is slightly larger than the outer diameter of the central hub 20 in order to allow the slip interface 22 to be positioned around the central hub 20. It is also desirable to leave a small gap between the central hub 20 and slip interface 22 in order to allow the slip interface 22 to compress when experiencing certain temperature changes. The shim 50 is utilized to occupy this gap between the outer diameter of the central hub 20 and the inner diameter of the slip interface 22, wherein the shim 50 frictionally engages the inner surface of the slip interface 22 in order to retain it its desired position during the formation process. After the base layer 30 is formed over the slip interface 22, the potted coil 12 is wound, and all the potting materials are cured, the components of the rotation sensor 10 are set in their desired positions and the shim 50 is then removed. The shim 50 should be formed of a metallic material or other similar material having sufficient stiffness to frictionally engage and retain the slip interface 22 in its desired position. The shim 50 is described as being cylindrical, but it is understood that the shim 50 may comprise any cross-sectional that occupies the space between the central hub 20 and the interface 22.

Figure 6:
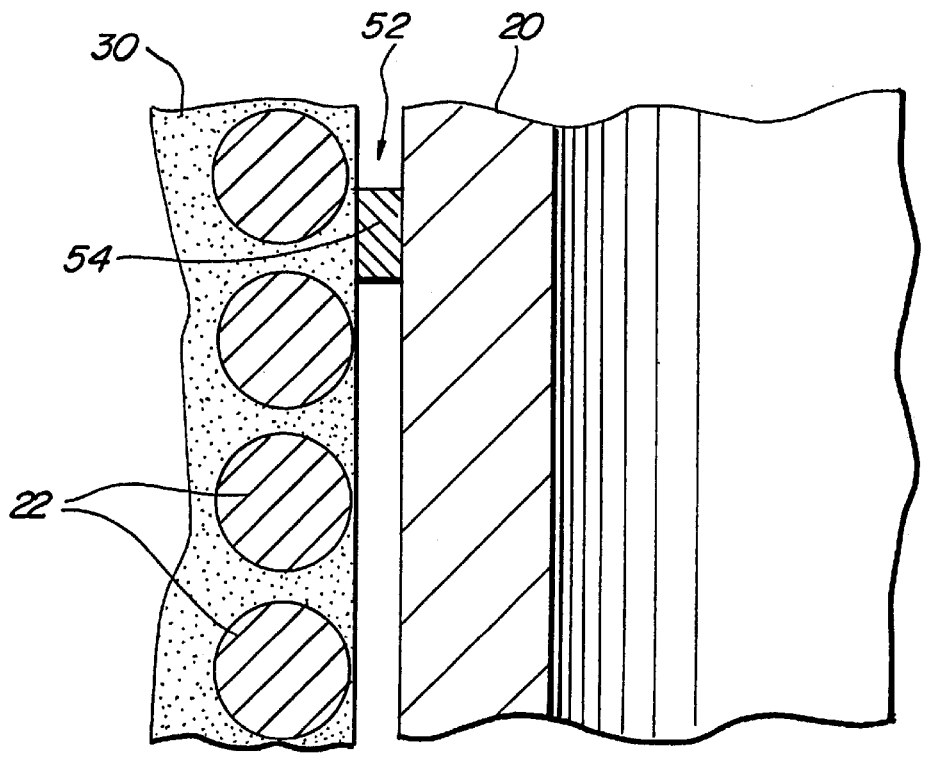
FIG. 6 is a fragmentary, cross-sectional view of the rotation sensor of FIG. 5.

Once the shim 50 is removed, a gap 52 will be exist in the area the shim occupied between the slip interface 22 and the central hub 20, as shown in FIG. 6. Radial centering of the potted coil 12 with respect to the central hub 20 will be provided by the attachment of the potted coil 12 to the mounting flange 18 via the cured potting material. In order to resist translational vibration of the coil pack 12 and slip interface 22 structure at the opposite end of the spool from the mounting flange 18, at least one tack of adhesive material 54 may be positioned in the gap 52 at the opposite end of said mounting flange 18. A plurality of equally circumferentially-spaced adhesive tacks 54 are preferably positioned around the central hub 20 in the gap 52 in order to minimize vibrational movement of the coil pack 12. It is also possible to position a continuous layer of adhesive material or a resilient O-ring in the gap 52 at the opposite end of the spool from the mounting flange 18 after the shim 50 is removed. The adhesive tacks 54 should be formed from an adhesive material having sufficient stiffness to resist translational vibration while allowing the slip interface 22 to move axially with the thermal expansion of the potted coil 12.

As can be seen from the foregoing, the improved IFOG hub to coil slip interface of the present invention provides a thermally conductive layer that the potted coil is wound upon which maintains a constant thermal and mechanical contact with the potted coil during thermal expansion of the potted coil. Moreover, a rotation sensor formed with the IFOG hub to coil slip interface of the present invention is substantially free of bias errors due to the changing temperatures and vibration present in the surrounding environment. Furthermore, a rotation sensor for an IFOG formed in accordance with the present invention reduces coil stressing and prevents bonding failure and cracking from occurring in the potting material within the potted coil.

In each of the above embodiments, the different structures of the system for providing an improved IFOG hub to coil thermal and mechanical slip interface of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A rotation sensor for use in a fiber optic gyroscope, comprising:
   a spool having a substantially cylindrical central hub and a substantially-planar mounting flange at one end thereof;
   a coil comprising a plurality of layers of coaxial turns of optical fiber embedded in a potting material, said potted coil having an inner surface and having one of its ends affixed to a surface of said mounting flange; and
   an interface positioned between an outer surface of said central hub and the inner surface of said potted coil, said interface having a length along the axial direction of said central hub which changes in conjunction with the thermal expansion of said potted coil, wherein said interface comprises a helically-wound spring.

2. The rotation sensor of claim 1, wherein said interface allows said potted coil to expand or contract along the axial direction of said central hub while maintaining constant contact with the inner surface of said potted coil.

3. The rotation sensor of claim 2, wherein said interface includes a plurality of portions which are spaced-apart from one another along the axial direction of said central hub.

4. The rotation sensor of claim 1, wherein said interface is formed from a material having substantially the same thermal expansion characteristics as said central hub.

5. The rotation sensor of claim 1, further comprising a layer of second potting material positioned over said interface.

6. The rotation sensor of claim 5, wherein the second potting material has substantially the same thermal expansion characteristics as the potting material in said potted coil.

7. The rotation sensor of claim 1, wherein said spring interface includes a plurality of spaced-apart windings, wherein said layer of second potting material extends in the areas between said windings of said spring interface.

8. The rotation sensor of claim 1, wherein the length of said interface is less than the axial length of said central hub.

9. The rotation sensor of claim 1, further comprising an adhesive material positioned between said central hub and at least one point on an inner surface of said interface.

10. The rotation sensor of claim 9, wherein said adhesive is positioned at equally circumferentially-spaced points around said central hub on an opposite end of said central hub from said mounting flange in order to minimize vibrational forces acting on said interface.

11. The rotation sensor of claim 1, further comprising a removable, cylindrical shim positioned between said central hub and said interface, wherein said cylindrical shim retains said interface in its desired position while said interface is attached to said central hub and the cylindrical shim is then removed after attachment is complete.

12. A rotation sensor for use in a fiber optic gyroscope, comprising:
    a spool having a substantially cylindrical central hub and a substantially-planar mounting flange at one end thereof;
    a coil comprising a plurality of layers of coaxial turns of optical fiber embedded in a potting material, said potted coil having an inner surface and having one of its ends affixed to a surface of said mounting flange; and
    an interface positioned between an outer surface of said central hub and the inner surface of said potted coil, said interface having a length along the axial direction of said central hub which changes in conjunction with the thermal expansion of said potted coil, wherein said interface comprises a plurality of spaced-apart cylindrical hoops.

13. The rotation sensor of claim 12, wherein said interface allows said potted coil to expand or contract along the axial direction of said central hub while maintaining constant contact with the inner surface of said potted coil.

14. The rotation sensor of claim 12, wherein said interface is formed from a material having substantially the same thermal expansion characteristics as said central hub.

15. The rotation sensor of claim 12, further comprising a layer of second potting material positioned over said interface, wherein said layer of second potting material extends between the spaced-apart cylindrical hoops of said interface.

16. The rotation sensor of claim 15, wherein the second potting material has substantially the same thermal expansion characteristics as the potting material in said potted coil.

17. The rotation sensor of claim 12, wherein the length of said interface is less than the axial length of said central hub.

18. The rotation sensor of claim 12, further comprising an adhesive material positioned between said central hub and at least one point on an inner surface of said interface.

19. The rotation sensor of claim 18, wherein said adhesive is positioned at equally circumferentially-spaced points around said central hub on an opposite end of said central hub from said mounting flange in order to minimize vibrational forces acting on said interface.

20. The rotation sensor of claim 12, further comprising a removable, cylindrical shim positioned between said central hub and said interface, wherein said cylindrical shim retains said interface in its desired position while said interface is attached to said central hub and the cylindrical shim is then removed after attachment is complete.

21. A rotation sensor for use in a fiber optic gyroscope, comprising:
    a spool having a substantially cylindrical central hub and a substantially-planar mounting flange at one end thereof;
    a coil comprising a plurality of layers of coaxial turns of optical fiber embedded in a potting material, said potted coil having an inner surface and having one of its ends affixed to a surface of said mounting flange;
    an interface positioned between an outer surface of said central hub and the inner surface of said potted coil, said interface having a length along the axial direction of said central hub which changes in conjunction with the thermal expansion of said potted coil; and
    an adhesive material positioned between said central hub and at least one point on an inner surface of said interface.

22. The rotation sensor of claim 21, wherein said adhesive is positioned at equally circumferentially-spaced points around said central hub on an opposite end of said central hub from said mounting flange in order to minimize vibrational forces acting on said interface.

23. The rotation sensor of claim 21, wherein said interface allows said potted coil to expand or contract along the axial direction of said central hub while maintaining constant contact with the inner surface of said potted coil.

24. The rotation sensor of claim 23, wherein said interface includes a plurality of portions which are spaced-apart from one another along the axial direction of said central hub.

25. The rotation sensor of claim 21, wherein said interface is formed from a material having substantially the same thermal expansion characteristics as said central hub.

26. The rotation sensor of claim 21, further comprising a layer of second potting material positioned over said interface, wherein the second potting material has substantially the same thermal expansion characteristics as the potting material in said potted coil.

27. The rotation sensor of claim 21, wherein the length of said interface is less than the axial length of said central hub.

28. The rotation sensor of claim 21, further comprising a removable, cylindrical shim positioned between said central hub and said interface, wherein said cylindrical shim retains said interface in its desired position while said interface is attached to said central hub and the cylindrical shim is then removed after attachment is complete.

29. A rotation sensor for use in a fiber optic gyroscope, comprising:
    a spool having a substantially cylindrical central hub and a substantially-planar mounting flange at one end thereof;
    a coil comprising a plurality of layers of coaxial turns of optical fiber embedded in a potting material, said potted coil having an inner surface and having one of its ends affixed to a surface of said mounting flange;
    an interface positioned between an outer surface of said central hub and the inner surface of said potted coil, said interface having a length along the axial direction of said central hub which changes in conjunction with the thermal expansion of said potted coil; and
    a removable, cylindrical shim positioned between said central hub and said interface, wherein said cylindrical shim retains said interface in its desired position while said interface is attached to said central hub and the cylindrical shim is then removed after attachment is complete.

30. The rotation sensor of claim 29, wherein said interface allows said potted coil to expand or contract along the axial direction of said central hub while maintaining constant contact with the inner surface of said potted coil.

31. The rotation sensor of claim 29, wherein said interface includes a plurality of portions which are spaced-apart from one another along the axial direction of said central hub.

32. The rotation sensor of claim 29, wherein said interface is formed from a material having substantially the same thermal expansion characteristics as said central hub.

33. The rotation sensor of claim 29, further comprising a layer of second potting material positioned over said interface, wherein the second potting material has substantially the same thermal expansion characteristics as the potting material in said potted coil.

34. The rotation sensor of claim 29, wherein the length of said interface is less than the axial length of said central hub.

35. The rotation sensor of claim 29, further comprising an adhesive material positioned between said central hub and at least one point on an inner surface of said interface, wherein said adhesive is positioned at equally circumferentially-spaced points around said central hub on an opposite end of said central hub from said mounting flange in order to minimize vibrational forces acting on said interface.

36. A method of forming a rotation sensor of the type that includes a coil having an inner surface and formed of a plurality of layers of turns of optical fiber encapsulated in a potting material and wound about the outer surface of a central hub of a spool of the type that includes at least one mounting flange, comprising:
    positioning an interface over an outer surface of said central hub, wherein said interface has a length along an axial direction of said central hub which changes in conjunction with the thermal expansion of said potted coil;
    positioning a cylindrical shim around said central hub which extends between said central hub and said interface in order to control the position of said interface on said central hub;
    forming said potted coil over said interface by winding the plurality of turns of optical fiber around said interface and encapsulating the turns of optical fiber in a potting material, said potting material further affixing said potted coil to said mounting flange; and
    removing said cylindrical shim after said potted coil is formed over said interface.

37. The method of claim 36, further comprising the step of applying a layer of a second potting material over said interface prior to forming said potted coil over said interface.

38. The method of claim 36, wherein said second potting material has substantially the same thermal expansion characteristics as the potting material in said potted coil.

39. The method of claim 36, wherein said interface includes a plurality of portions which are spaced-apart from one another along the axial direction of said central hub, wherein said layer of second potting material extends in the areas between the spaced-apart portions of said interface so as to allow the interface to contract in the axial direction along said central hub.

40. The method of claim 36, further comprising the step of placing an adhesive between said central hub and at least one point on an inner surface of said interface in a spacing left between said central hub and said interface by the removal of said cylindrical shim.

41. The method of claim 40, wherein said adhesive is positioned at equally circumferentially-spaced points around said central hub on an opposite end of said central hub from said mounting flange in order to minimize vibrational forces acting on said interface.

42. The method of claim 36, wherein said interface is a helically-wound spring.

43. The method of claim 42, further comprising stretching said spring prior to positioning said spring over said central hub in order to provide a tighter connection between said spring and said central hub.

44. The method of claim 36, wherein said interface comprises a plurality of spaced-apart cylindrical hoops.

45. A method of forming a rotation sensor of the type that includes a coil having an inner surface and formed of a plurality of layers of turns of optical fiber encapsulated in a potting material and wound about the outer surface of a central hub of a spool of the type that includes at least one mounting flange, comprising:
    positioning an interface over an outer surface of said central hub, wherein said interface has a length along an axial direction of said central hub which changes in conjunction with the thermal expansion of said potted coil; and forming said potted coil over said interface by winding the plurality of turns of optical fiber around said interface and encapsulating the turns of optical fiber in a potting material, said potting material further affixing said potted coil to said mounting flange, wherein said interface is a helically-wound spring.

46. The method of claim 45, wherein said spring is stretched prior to being positioned over said central hub in order to provide a tighter connection between said spring and said central hub.

47. The method of claim 45, further comprising applying a layer of a second potting material over said interface prior to forming said potted coil over said interface.

48. The method of claim 47, wherein said second potting material has substantially the same thermal expansion characteristics as the potting material in said potted coil.

49. The method of claim 47, wherein said spring interface includes a plurality of spaced-apart windings, wherein said layer of second potting material extends between said windings so as to allow said spring interface to contract in the axial direction along said central hub.

50. The method of claim 45, further comprising placing an adhesive between said central hub and at least one point on an inner surface of said interface in a spacing between said central hub and said interface.

51. The method of claim 50, wherein said adhesive is positioned at equally circumferentially-spaced points around said central hub on an opposite end of said central hub from said mounting flange in order to minimize vibrational forces acting on said interface.

52. A method of forming a rotation sensor of the type that includes a coil having an inner surface and formed of a plurality of layers of turns of optical fiber encapsulated in a potting material and wound about the outer surface of a central hub of a spool of the type that includes at least one mounting flange, comprising:

positioning an interface over an outer surface of said central hub, wherein said interface has a length along an axial direction of said central hub which changes in conjunction with the thermal expansion of said potted coil; and forming said potted coil over said interface by winding the plurality of turns of optical fiber around said interface and encapsulating the turns of optical fiber in a potting material, said potting material further affixing said potted coil to said mounting flange, wherein said interface comprises a plurality of spaced-apart cylindrical hoops.

53. The method of claim 52, further comprising applying a layer of a second potting material over said interface prior to forming said potted coil over said interface.

54. The method of claim 53, wherein said second potting material has substantially the same thermal expansion characteristics as the potting material in said potted coil.

55. The method of claim 53, wherein said layer of second potting material extends between said spaced-apart cylindrical hoops of said interface.

56. The method of claim 52, further comprising placing an adhesive between said central hub and at least one point on an inner surface of said interface in a spacing between said central hub and said interface.

57. The method of claim 56, wherein said adhesive is positioned at equally circumferentially-spaced points around said central hub on an opposite end of said central hub from said mounting flange in order to minimize vibrational forces acting on said interface.

* * * * *